United States Patent [19]
Leone

[11] 3,990,814
[45] Nov. 9, 1976

[54] SPINNER
[75] Inventor: Donald J. Leone, Tolland, Conn.
[73] Assignee: United Technologies Corporation, Hartford, Conn.
[22] Filed: June 25, 1975
[21] Appl. No.: 590,235

[52] U.S. Cl. ............................................. 416/245 R
[51] Int. Cl.² ........................................... B64C 11/14
[58] Field of Search ............... 416/245, 245 A, 244, 416/225, 94

[56] References Cited
UNITED STATES PATENTS

| 934,633 | 9/1909 | Scott | 416/245 A X |
| 1,730,742 | 10/1929 | Nelson | 416/245 |
| 1,773,319 | 8/1930 | Rauen | 416/245 |
| 2,297,226 | 9/1942 | Keuth et al. | 416/245 |
| 2,405,285 | 8/1946 | Blanchard et al. | 416/245 X |
| 3,792,938 | 2/1974 | Wilde | 416/245 A |
| 3,834,157 | 9/1974 | Hoffmann | 416/245 X |
| 3,901,627 | 8/1975 | Sullivan | 416/245 |

FOREIGN PATENTS OR APPLICATIONS

| 543,467 | 9/1922 | France | 416/245 |

Primary Examiner—Everette A. Powell, Jr.
Attorney, Agent, or Firm—Norman Friedland

[57] ABSTRACT

The spinner for a fan jet engine is constructed from a metallic material having sufficient strength so that it serves as a structural support affording stiffness to the rim of the fan disc.

8 Claims, 2 Drawing Figures

SPINNER

BACKGROUND OF THE INVENTION

This invention relates to spinners and particularly for fan jet engines.

Conventionally, the spinner serves to provide a smooth aerodynamic wall surface to not only cover the mechanism in a rotating machinery, such as the hub and shaft of a fan jet engine but also defines a contour for directing the air flow and heretofore was never utilized as a structural member. Accordingly, it is customarily made out of nonstructural material, such as sheet metal, molded glass fibers or other composite material.

I have found that I can achieve the customary spinner function and also achieve certain advantages in the engine operation and performance by manufacturing the spinner outer body from a suitable material having high resilience and strength and preloading it so that it loads the fan rim. Thus, I am able to obtain the following advantages:

1. Fan stage weight is optimized in obtaining the necessary stage vibratory and flutter design goals.
2. Foreign object damage in the area of the spinner is reduced.
3. The spinner provides a fail-safe mechanism for fan blade retention in the event of tablock failure.

SUMMARY OF THE INVENTION

An object of this invention is to provide an improved spinner.

A further object of this invention is to fabricate the side body portion or outer wall of the spinner from a structural material and preload it under compression at a predetermined spring rate to add stiffness to the fan disc.

A still further object is to provide a spinner characterized as being structural to the engine, simple to fabricate and install.

Other features and advantages will be apparent from the specification and claims and from the accompanying drawings which illustrate an embodiment of the invention.

DESCRIPTION OF THE PREFERRED EMBODIMENT

Figure 1:
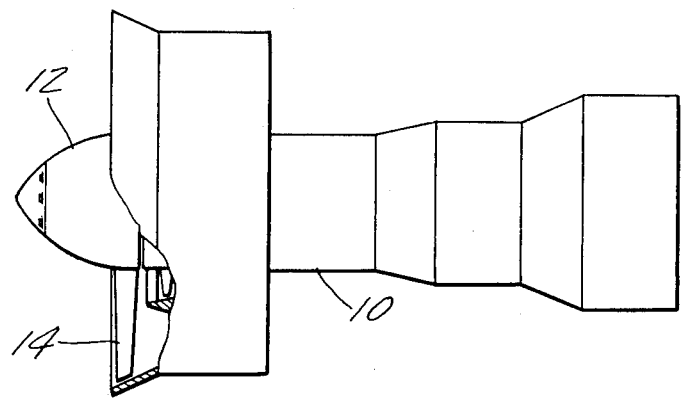
FIG. 1 is a schematic of a fan jet engine with the spinner installation.
Figure 2:
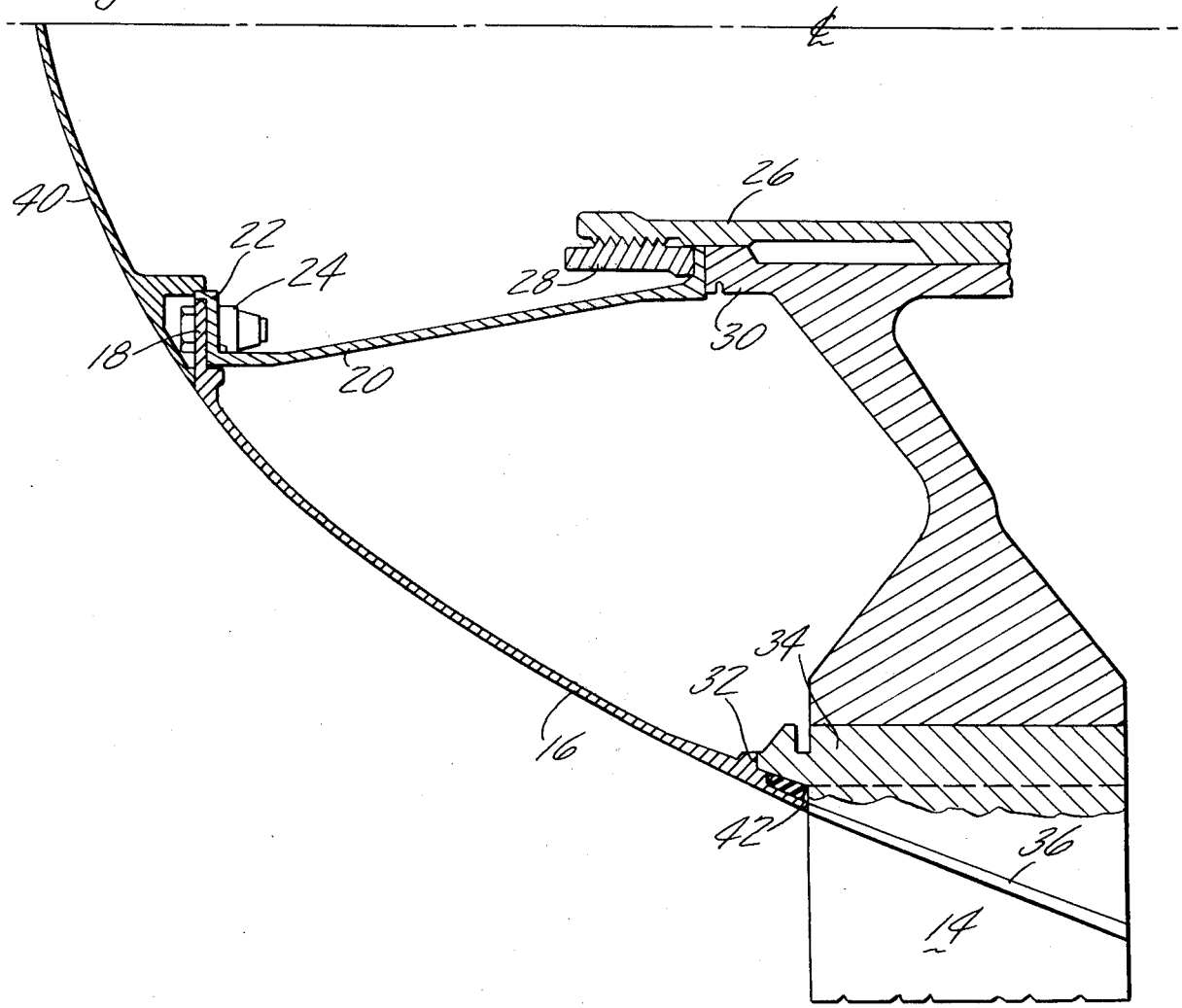
FIG. 2 is a partial view in section and elevation showing the spinner details attached to the fan.

Referring to FIG. 1 a typical fan jet engine 10 is disclosed as shown in full with a partial break-away showing the spinner 12 and its relationship to the fan 14. Spinner 12 comprises a frusto-conically shaped body member 16 made from a high resilient metal and carries flange portion 18 at its fore end. A retaining element 20, likewise frusto-conically shaped and fabricated from a similar material also carries mating flange 22 abutting the inner face of flange 18. A plurality of circumferentially spaced nut and bolt assemblies (one being shown) generally indicated by reference numeral 24 secure the assembly. The other or aft end of element 20 is secured to the engine shaft 26 by lock nut 28 and abuts against the fan disc 30.

Prior to assembling the spinner body to element 20 a predetermined gap between flange 22 and 18 is provided so that when the unit is torqued to a calibrated value the shoulder portion 32 of body 16 bears against rim 34 of fan disc 30 at a predetermined spring load. It will be appreciated from the foregoing that element 20 is loaded in tensile and body 16 is loaded in compression where the manifested line of action of the force lies almost in coincidence with the platform 36. This serves to constantly preload the fan disc in an aft direction.

A dome cap 40 which is assembled after the body 16 is assembled is nonstructural and may be fabricated from a composite material and is secured to flange 18 by any suitable method, as by bolts extending from flange 18 (not shown). A commercially available sealing material 42 in the gap adjacent the fan platform 36 serves to prevent air from entering the platform end rather than the blades.

It should be understood that the invention is not limited to the particular embodiments shown and described herein, but that various changes and modifications may be made without departing from the spirit or scope of this novel concept as defined by the following claims.

I claim as my invention:

1. A spinner for a fan having a disc supporting the fan blades for a fan jet engine, said spinner comprising a structural inner body supported to a shaft of the engine to be rotated therewith adjacent said fan, a structural outer body forming the aerodynamic contour of said spinner supported to said structural inner body preloading said fan disc in a given direction.

2. A spinner as claimed in claim 1 wherein said structural inner body extends from the shaft to the fore end of said spinner and is mounted in tension to impart a compressional force to the structural outer body.

3. A spinner as claimed in claim 2 including a shoulder formed on the inner diameter of said structural outer body at its wider end bearing against said fan disc.

4. A spinner as claimed in claim 2 wherein said structural inner body is frusto-conically shaped.

5. A spinner as claimed in claim 2 including a cap element attached to the fore end of said structural outer body.

6. A spinner as claimed in claim 4 wherein said structural inner body converges from the point of attachment to said structural outer body to the point of attachment to said shaft.

7. A spinner as claimed in claim 3 including a complementary shoulder formed on said fan disc engageable with said shoulder of said structural outer body.

8. A spinner for a turbofan engine having a dome-like shell portion defining an aerodynamic contour for guiding the air flow to the fan, said fan having a disc supported to the engine shaft, an inner member having one end supported to said shaft and extending axially in proximity to the smaller diameter of said dome-like shell portion and there being a gap therebetween prior to assembly, a plurality of fastening means interconnecting said shell portion and said inner member and adjustable to adjust said gap to place said inner member in tension and said dome-like shell in compression, and the larger diameter end of said dome-like shell bearing up against said disc whereby said dome-like shell preloads said disc a predetermined amount.

* * * * *